April 18, 1939.　　　C. J. ODEND'HAL　　　2,155,170
REDUCING VALVE
Filed Dec. 28, 1937
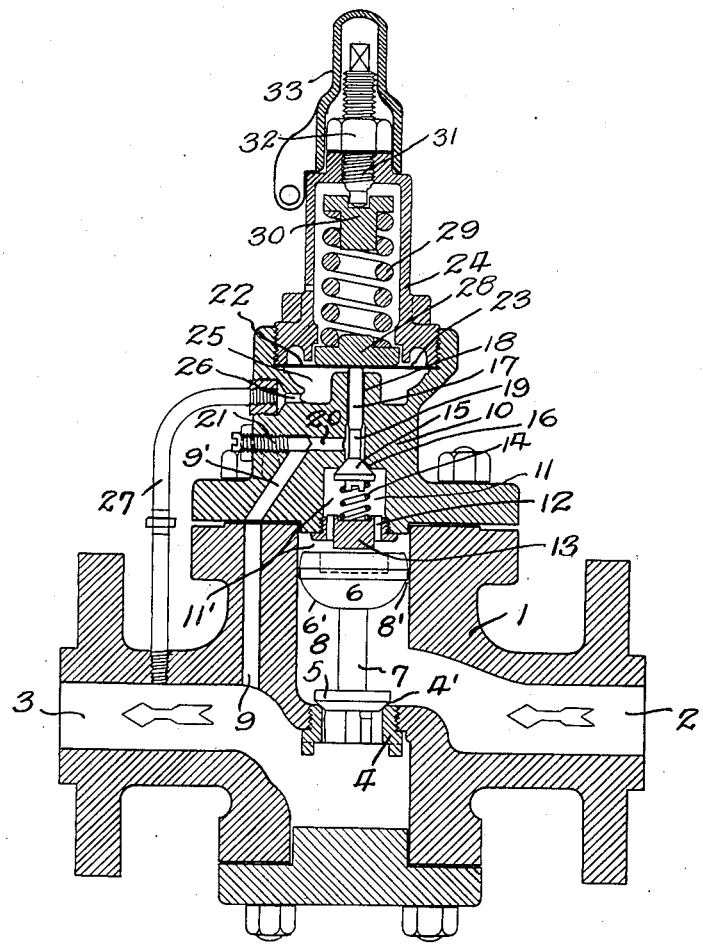
Inventor
C. J. ODEND'HAL
By J. F. Mothershead
Attorney Patented Apr. 18, 1939

2,155,170

UNITED STATES PATENT OFFICE 2,155,170

REDUCING VALVE

Charles J. Odend'hal, Washington, D. C.

Application December 28, 1937, Serial No. 182,150

2 Claims. (Cl. 50—11)

(Granted under the act of March 3, 1883, as amended April 30, 1928; 370 O. G. 757)

The invention described herein may be manufactured and used by or for the Government of the United States for governmental purposes without the payment to me of any royalty thereon, in accordance with the provisions of the act of April 30, 1928 (ch. 460, 45 Stat. L. 467).

This invention relates to improvements in reducing valves, or those valves employed to reduce the pressure from a high pressure source to points where a lower pressure is desired.

The primary object of the invention is to provide a valve that will embody a construction in which the usual diaphragm is employed, but whose functions may be dispensed with, as when the diaphragm breaks, which is a common occurrence, the valve will not be put out of commission, there being as will appear, the possibility of quick adjustments, readily made without taking the valve apart, to enable it to continue to function satisfactorily and without injury to any of the parts until, conveniently, the diaphragm can be replaced.

A further object of the invention is to produce a valve of the character mentioned through which the fluid, as gas or steam, hereinafter for convenience mentioned as steam, will pass from the high pressure inlet to the lower pressure outlet while operating the various elements of the organization to reliably reduce the pressure from the high pressure source to a predetermined lower pressure, with a smooth, coordinated action of elements, free from such sudden movements that are likely to injure the parts and cause noisy operation.

Another object is to reduce the working parts of the valve and so form the parts employed as to reduce friction to a minimum. For instance, a piston is so formed and so positioned and related to the cylinder in which it works that no rubbing between the piston and cylinder can occur, and to incidentally provide between the piston and the cylinder an orifice having important functions in the operation of the valve and to maintain, by the fluid pressure, uniformity of the orifice and the true vertical movement of the piston and its valve. Further, due to the fact so far as I am aware, that the pressure differences on each side of the pilot valve are less than in valves of this character heretofore known, there is less wire drawing of the steam.

In the drawings the figure is a vertical central section of the valve, the piston valve and pilot valve being closed.

Referring to the drawings, the numeral 1 designates the main body which is adapted for connection with suitable piping from the source of high steam pressure and to points of use where a lower pressure is required or desired. The high pressure inlet is indicated by the numeral 2, whereas 3 designates the lower pressure outlet, there being intermediate of these openings a seat ring 4 provided with a seat 4' for the piston valve 5 connected with the piston 6 by a stem 7, the piston being located and working in a cylinder 8, but which, for reasons that will appear, does not contact with the cylinder wall, but is spaced therefrom and laterally balanced in the cylinder so as to form between the wall and the greatest diameter of the piston an annular orifice 8' through which steam entering the high pressure inlet 2 passes to parts of the structure about the piston. The formation of the piston is a feature of the invention, it being so shaped that the steam contacting its lower spherical portion 6' will exert an equalizing pressure in all movements of the piston, thus assuring true vertical movement with the consequent true seating of the valve 5.

The essentials of the body 1 are completed by a conduit 9 in said body leading from the lower pressure outlet 3, to and through the body where its upper end registers with a shorter conduit 9' in a bonnet 10 securely bolted to the body, as shown.

The lower part of the bonnet is provided with a cylindrical recess 11 in free communication with the cylinder 8, through apertures 12 in a spring seat 13 which is threaded into the bottom of the chamber or recess 11, there being a spring 14 seated on the seat with its upper end surrounding a boss on the bottom of a pilot valve 15 which is adapted to rest upon the seat 16 in the top of the chamber.

The pilot valve has a stem 17, the upper part of which fits snugly in a bore 18 in the bonnet, the stem being formed with a reduced portion 19 so as to form a passage around said stem that communicates with an orifice 20, which in turn communicates with the conduit 9', the outer end of the orifice 20 being provided with a seat for a needle valve 21 by which communication between the high pressure and the lower pressure sides of the valve may be regulated.

The upper part of the bonnet 10 is recessed and provided with an annular internal shoulder or seat 22 for a diaphragm 23 which spans the recess and whose circumferential edge is clamped between the seat and the bottom of a hollow cylindrical housing 24, which is threaded into the bonnet, the diaphragm and recess forming a pressure chamber 25, the pressure in which determines the pressure at the lower pressure side of the valve. Communicating with this chamber 25 through a port 26 is a pipe 27 whose lower end is let into the outlet passage 3.

Above the diaphragm and resting thereon is a follower 28 whose central raised portion extends into a pressure-adjusting spring 29, the upper end of the coil of the spring being entered by a flanged plug 30 provided centrally with a recess to receive the lower end of the adjusting screw 31 which is threaded into the housing where, at the top of the housing it is provided with a lock nut 32.

It will be noted that the stem 17 of the pilot valve extends slightly above its bore in the bonnet and into engagement with the diaphragm, in which engagement it remains, the position shown being that occupied when the pilot is closed.

On the top of the housing, preferably a protective cap 33 is placed which may be provided with a lock to prevent tampering with the adjusting screw.

It will be observed that since there is free communication through openings 13, between the part of the cylinder 8 above the piston and the recess or chamber 11, these spaces may be considered as a single chamber, which I have designated, more particularly for convenience of description of the operation of the valve, as composite chamber 11'.

Assuming the high pressure end of the valve is connected with a source of steam, say at 400 pounds per square inch, and it is desired to reduce this pressure on the lower pressure side of the valve to 40 pounds per square inch, the operation of the valve is substantially as follows:

The diaphragm is adjusted against the yielding pressure of spring 29 to assure a pressure of 40 pounds in pressure chamber 25, thus unseating the pilot valve. Steam now let into the inlet passage 2 will pass into the cylinder 8, meanwhile exercising a force to keep the valve 5 seated, and will pass through the annular orifice 8' formed between the periphery of the piston at its greatest diameter, and the wall of the cylinder, and through the openings 12, through the chamber 11, by the pilot valve 15, and through the orifice 20, and passages formed by the conduits 9' and 9, into the lower pressure passage 3 (the needle valve 21, of course, being open). When the pressure in passage 3 builds up to 40 pounds, and a little more, it reacts through pipe 27 to build up a similar pressure in pressure chamber 25 when the pilot valve will be closed. Should the pressure in the chamber 25 drop below 40 pounds, the diaphragm will be moved down, forcing the pilot valve off its seat. Steam can then flow by the piston and through the communicating passages and orifices to the passage 3.

There is a definite relationship between the pressure in passage 2, area of orifice 8', on the one hand, and the pressure in the composite chamber 11' and orifice 20. Having a definite pressure of, say, 400 pounds per square inch in the inlet passage 2, and a pressure of, say, 80 pounds per square inch in the composite chamber 11', the pressure acting on the piston 6 and the valve 5 results in an unbalanced pressure that lifts the piston and unseats the valve 5. Steam can then flow direct from the passage 2 to passage 3. This causes the pressure in 3 to rise until 40 pounds (or any other predetermined reduced pressure) is reached, when the pressure under the diaphragm 23 will overcome the tension of the spring 29, moving the diaphragm upward and permitting the spring 14 to seat the pilot valve, thereby shutting off the flow of steam to the orifice 20 and its connecting passages. Steam will continue to flow through orifice 8' until pressure in the composite chamber 11' equals the pressure in the inlet passage 2. Now the pressures acting on the combined areas of the piston 6 and the valve 5 result in a downward pressure which seats the valve 5. Obviously, steam can no longer flow direct from the passage 2 to the passage 3 and consequently if steam be used from the low pressure end of the valve, the pressure will again drop below 40 pounds when the cycle will be repeated.

As intimated there is a mathematical relationship between the orifice 8' around the piston, and the orifice 20 in the wall of the bonnet 10 that will permit the valve to function and maintain a desired reduced pressure in the passage 3, even though the diaphragm should break. This is a protective feature, not incorporated, so far as I am aware, in standard reducing valves, and the construction is such that the adjustment of the needle valve 21, will regulate the pressure desired in passage 3.

To adjust the valve for a reduced pressure, the needle valve and spring 29 are regulated separately. First the needle valve is opened, and then the spring 29 is adjusted for the desired pressure, which will cause the pilot valve 15 to open. Then the needle valve is adjusted until a slightly higher pressure than that obtained by the adjustment of the spring 29, is indicated.

The valve will then operate in connection with the diaphragm until the diaphragm breaks, and when this occurs it will operate independently of said diaphragm by virtue of the orifices 8' and 20, but at a slightly higher pressure. If it is desired to operate exclusively by the orifices the needle valve should be regulated to give a slightly higher pressure than that obtained by the spring 29.

This obviously will insure a longer life of the diaphragm.

The housing 24 is provided with the usual "telltale" opening 34 through which, should the diaphragm break, steam or gas would be permitted to escape in a small stream.

I claim:

1. A reducing valve having a high pressure inlet and a low pressure outlet, a valve controlling the direct passage of fluid between said openings, a cylinder, a piston in said cylinder connected with said valve, the piston being of smaller diameter than the cylinder whereby an orifice is formed between the piston and the cylinder, a chamber communicating with the space above the piston, a pressure chamber, a pilot valve seated in the first-mentioned chamber and having a stem extending into the pressure chamber, means for holding the pilot valve normally closed, a fluid space adjacent the pilot valve stem out of direct communication with the pressure chamber, a controllable passage between said fluid passage and the lower pressure side of the valve, manually operable means for controlling the controllable passage, a conduit establishing constant communication between the pressure chamber and the lower pressure side of the valve, and yielding means adjustable to a predetermined pressure and operating on the pilot valve to open and to permit the closing of said valve accordingly as the pressure in the pressure chamber varies.

2. The invention as claimed in claim 1 characterized in that the piston below its greater diameter is spherical in shape downwardly below its greatest diameter, so that fluid pressure acting on said piston will balance it laterally and thereby assure uniformity of the orifice between the cylinder and piston.

CHARLES J. ODEND'HAL.